Feb. 13, 1945. J. H. JALBERT 2,369,570
CONNECTING DEVICES FOR ELECTRICAL INSTRUMENTS ON AIRCRAFT
Filed Jan. 21, 1942
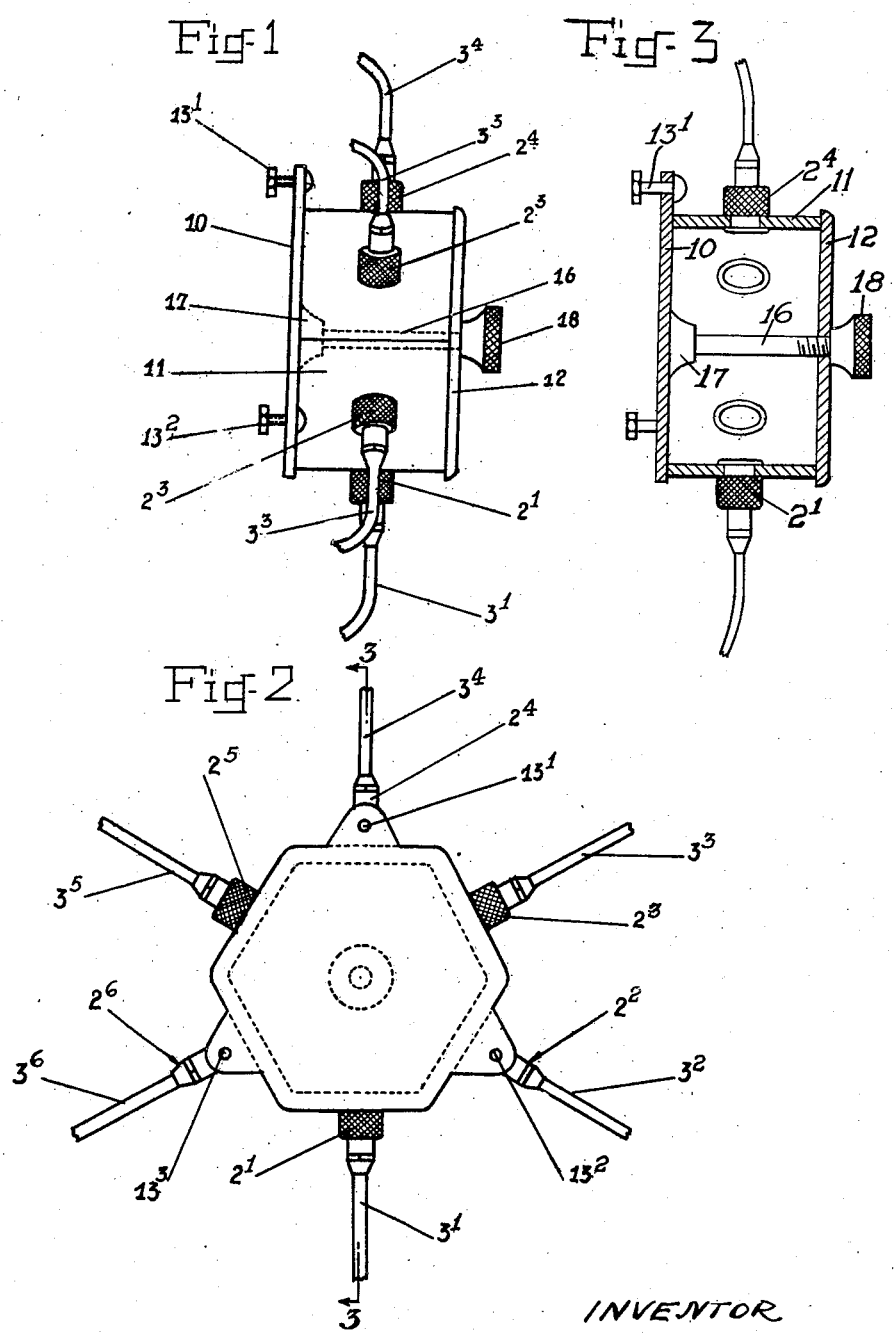
INVENTOR
JEAN H. JALBERT Patented Feb. 13, 1945

2,369,570

UNITED STATES PATENT OFFICE 2,369,570

CONNECTING DEVICE FOR ELECTRICAL INSTRUMENTS ON AIRCRAFT

Jean Henry Jalbert, Paris, France; vested in the Alien Property Custodian

Application January 21, 1942, Serial No. 427,660
In Great Britain January 31, 1941

1 Claim. (Cl. 220—3.94)

This invention relates to improvements in devices for connecting electrical wiring and the like on aircraft.

Heretofore, devices for connecting and assembling electrical parts on aircraft have the disadvantage that they require the assembly of the complete plant on the craft itself which requires much time and labor as well as skillful workmanship. Furthermore, this practice renders the making of repairs difficult and tedious inasmuch as it becomes frequently necessary to completely or partially disassemble or dismount the installation.

Accordingly, the present invention has primarily in view obviating the disadvantages above set forth and providing a convenient and practical means for installing and repairing electrical connections or the like in a minimum space of time and with the minimum number of operations, in a thoroughly simple, practical and reliable manner.

A preferred and more practical embodiment of the invention is shown in the accompanying drawing, in which:

Figure 1 is a side elevation of the improved connecting box.

Figure 2 is a rear elevation of the construction shown in Figure 1.

Figure 3 is a vertical sectional view taken on the line 3—3 of Figure 2.

Similar reference characters designate corresponding parts throughout the several figures of the drawing.

According to the embodiment of the invention shown in Figures 1 and 2 the same comprises a connecting box 1 having six plug sockets $2'$ $2''$ . . . The plugs engaging the said sockets are connected to the end of the cables $3'$ $3''$ . . . . The said cables with metal sheath have respectively the same number of conductors as the apparatuses to which they are connected, so that there are on the inner faces of the connecting box as much groups of terminals as there are apparatuses provided. All the connections which are necessary for the general operation are made in the inner part of the connecting box.

The connecting box 1 is more particularly shown in Figures 1 and 2. This box comprises three elements: a base 10, a ring 11 and a flange 12 forming the cover.

The base 10 is secured on a partition wall of the aircraft, for instance by means of screws $13^1$—$13^2$—$13^3$.

The ring 11 has a polygonal form, for example a hexagonal form. A connecting terminal $2^1$—$2^2$ . . . is mounted on each face of this polygon, which facilitates the mounting of the conductors $3^1$—$3^2$ . . . and their examination.

The cover flange 12 is applied onto the ring 11.

A middle screw 16 the end of which is secured in a boss 17 of the base 10 passes through the cover 12 and receives a knurled nut 18 which by being screwed on to the screw insures the tightening of the three elements of the box on another.

The above described plant insures a plurality of advantages and more particularly the following:

1. Establishing, examination and repair of the connections in a very short time with very simple manipulations; it is sufficient, indeed, to unscrew the nut 18, to remove the cover 12 and the ring 11; after this a very ready access to the connections is given on both faces of the said ring simultaneously.

2. The securing and the tightening of the ring 11 and the cover flange 12 are insured by a single screw and a single nut acting through the middle and by moving the flange 12 nearer to the base 10 so as to tighten the ring and to insure the tightness.

I claim:

A junction box for centralizing wiring connections and the like of aircraft and rendering the same easily accessible, comprising, in combination, a base, a multi-sided wall-forming member having a plurality of flat angularly disposed sides and having one edge abutting the base, a tubular connection-socket on each one of the flat sides of said wall-forming member serving as lead-in supports for the elements to be joined by said box, a post having its inner end permanently secured centrally of the inner face of the base and having its outer end threaded, a cover having a profile corresponding to the multi-sided wall-forming member and provided with a central opening for receiving the threaded end of the post, said cover resting on the edge of the wall-forming member opposite the base, a knurled nut releasably threaded on the threaded end of the post assembly to clamp the cover to the wall-forming member and base.

JEAN HENRY JALBERT.